United States Patent
Guo (10) Patent No.: US 9,359,788 B2
(45) Date of Patent: Jun. 7, 2016

(54) CLUTCH DRIVING MECHANISM AND METHODS OF MAKING AND USING THEREOF

(71) Applicant: Scyan Electronics LLC, Issaquah, WA (US)

(72) Inventor: Yan Guo, Issaquah, WA (US)

(73) Assignee: Scyan Electronics LLC

( * ) Notice: Subject to any disclaimer, the term of this patent is extended or adjusted under 35 U.S.C. 154(b) by 397 days.

(21) Appl. No.: 13/944,757

(22) Filed: Jul. 17, 2013

(65) Prior Publication Data

US 2014/0021007 A1    Jan. 23, 2014

Related U.S. Application Data

(60) Provisional application No. 61/672,771, filed on Jul. 18, 2012.

(51) Int. Cl.
| | |
|---|---|
| F16D 23/12 | (2006.01) |
| E05B 3/00 | (2006.01) |
| E05B 27/00 | (2006.01) |
| F16D 11/16 | (2006.01) |
| E05B 63/04 | (2006.01) |

(52) U.S. Cl.
CPC ............. *E05B 3/003* (2013.01); *E05B 27/00* (2013.01); *E05B 63/04* (2013.01); *F16D 11/16* (2013.01); *F16D 23/12* (2013.01); *Y10T 70/5832* (2015.04); *Y10T 292/57* (2015.04); *Y10T 292/85* (2015.04)

(58) Field of Classification Search
CPC ... F16D 11/16; F16D 23/12; F16D 2023/126; F16D 28/00; F16D 43/00; F16D 48/06
See application file for complete search history.

(56) References Cited

U.S. PATENT DOCUMENTS

| | | | |
|---|---|---|---|
| 4,664,433 A | 5/1987 | Solovieff | |
| 4,672,829 A | 6/1987 | Gater et al. | |
| 4,698,989 A | 10/1987 | Zuckerman | |
| 4,844,522 A | 7/1989 | Pechar | |
| 5,364,139 A | 11/1994 | Bergen et al. | |
| 6,145,353 A | 11/2000 | Doucet | |
| 6,845,642 B2 * | 1/2005 | Imedio Ocana | 70/277 |
| 7,574,883 B2 | 8/2009 | Grampurohit | |
| 7,775,075 B2 | 8/2010 | Grampurohit | |
| 7,900,489 B2 | 3/2011 | Roth et al. | |
| 8,056,379 B2 | 11/2011 | Dickhans et al. | |
| 8,272,241 B2 | 9/2012 | Brown et al. | |
| 8,336,349 B2 | 12/2012 | Thimmappa et al. | |
| 8,491,023 B2 | 7/2013 | Brannaman et al. | |
| 2009/0025436 A1 | 1/2009 | Roth et al. | |
| 2009/0282881 A1 | 11/2009 | Grampurohit | |
| 2013/0008213 A1 | 1/2013 | Brown et al. | |
| 2013/0227996 A1 | 9/2013 | McKibben et al. | |

* cited by examiner

*Primary Examiner* — Huan Le (57) ABSTRACT

A clutch driving mechanism, comprising a motor, a worm, a torsion spring and a clutch rotating arm, wherein the motor is rotationally coupled with the worm, wherein the worm is operably coupled to at least a portion of the torsion spring, and the torsion spring is operably coupled to at least a portion of the clutch rotation arm.

15 Claims, 9 Drawing Sheets

CLUTCH DRIVING MECHANISM AND METHODS OF MAKING AND USING THEREOF

CROSS REFERENCE TO RELATED APPLICATIONS

This application claims the benefit of the filing date of U.S. Provisional Application Ser. No. 61/672,771 filed Jul. 18, 2012 under 35 U.S.C. 119(e), the entire disclosure of which is incorporated by reference herein.

TECHNICAL FIELD

This disclosure relates generally to lock systems, apparatuses, and devices for providing a locking function.

BACKGROUND

Unless otherwise indicated herein, the materials described in this section are not prior art to the claims in this application and are not admitted to be prior art by inclusion in this section.

A lock is a mechanical or an electronic device for restricting access to an enclosed property. More specifically, the lock is adapted to protect against forced and surreptitious entry to the enclosed property or the particular area. The lock may be used on a door, furniture, a vehicle, a container such as a storage box or a bike.

A clutch driving mechanism inside a lock system often functions to convert a torque power, such as a rotation, into a linear movement, which leads to coupling or uncoupling of various components in the lock therefore locking or unlocking the lock system.

SUMMARY

The following summary is illustrative only and is not intended to be in any way limiting. In addition to the illustrative aspects, embodiments, and features described above, further aspects, embodiments, and features will become apparent by reference to the drawings and the following detailed description.

In one aspect, the disclosure provides a clutch driving mechanism. In one embodiment, the clutch driving mechanism includes components including a motor, a worm, a torsion spring and a clutch rotating arm. Each component is operably coupled in such a way that the motor is configured to rotate the worm, the rotation of the worm is configured to cause a linear movement on at least a portion of the torsion spring, and the linear movement of the at least a portion of the torsion spring is configured to cause the movement on the clutch rotation arm.

For example, the motor may be rotationally coupled with the worm so that the motor is configured to drive the rotation of the worm. At least a portion of the torsion spring may be operably coupled to the worm so that the rotation of the worm is configured to produce a linear movement on the at least a portion of the torsion spring. The torsion spring may be operably coupled to at least a portion of the clutch rotation arm so that the torsion spring is configured to move the at least a portion of the clutch rotation arm.

In one embodiment, the torsion spring may have a first spring end portion and a second spring end portion. The first spring end portion may be operably coupled with the worm directly or indirectly.

The clutch rotating arm may include a first arm end portion, a middle arm portion, and a second arm end portion. The middle arm portion intermediates the first arm end portion and the second arm end portion. The clutch rotation arm may be operably coupled to the torsion spring at the first arm end portion. In one embodiment, the clutch rotating arm may generally adopt an L-like structure. The middle arm portion may be anchored serving as a pivoting point.

The first arm end portion may be coupled with the first spring end portion so that the linear movement on the first spring end portion moves the first arm end portion causing the L-shaped clutch rotating arm to swing around the pivoting point and therefore producing a movement, such as swing motion, on the second arm end portion. The first arm end portion may be coupled to the first spring end portion in any fashion.

In one embodiment, the clutch driving mechanism may further include an actuating pin. The second arm end portion is configured to interact with the actuation pin so that movement of the second arm end portion is configured to move actuation pin.

In one embodiment, the clutch driving mechanism may further include a first clutch shaft, a second clutch shaft, and an actuation pin. The first clutch shaft may be configured to receive at least a portion of the second clutch shaft; and the first clutch shaft and the second clutch shaft may be configured to rotate concentrically. The first clutch shaft and the second clutch shaft are configured to be operably coupled through the actuation pin. When the first clutch shaft and the second clutch shaft are in operably coupled state, they would rotate together. When the first clutch shaft and the second clutch shaft are in operably uncoupled state, each may rotate freely or independently from the other.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments arranged in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to mechanisms, methods, apparatus, systems, and/or devices related to locks, lock clutches, and clutch driving mechanisms, which have the advantage of, without limitation, being simple, easy to use, durable, and having a low production cost.

In one aspect, the disclosure provides a clutch driving mechanism. In one embodiment, the clutch driving mechanism includes components including a motor, a worm, a torsion spring and a clutch rotating arm. Each component is operably coupled in such a way that the motor is configured to rotate the worm, the rotation of the worm is configured to cause a linear movement on the torsion spring, and the linear movement of the torsion spring is configured to cause the movement on the clutch rotation arm.

For example, the motor may be rotationally coupled with the worm so that the motor is configured to drive the rotation of the worm. At least a portion of the torsion spring may be operably coupled to the worm so that the rotation of the worm is configured to produce a linear movement on the at least a portion of the torsion spring. The torsion spring may be operably coupled to at least a portion of the clutch rotation arm so that the torsion spring is configured to move the at least a portion of the clutch rotation arm.

The motor may be any electric driven motor. In one example, the motor may be a battery operated motor. In another example, the motor may be an AC operated motor. In a third example, the motor may be a DC operated motor.

In one embodiment, the torsion spring may have a first spring end portion and a second spring end portion. The first spring end portion may be operably coupled with the worm. For example, the first spring end portion may abut against at least a portion of worm. The second spring end portion may be anchored, in which case the rotation of the worm is configured to produce a linear swing motion on the first spring end portion while the second spring end portion stays stationary. In one embodiment, the second spring end portion may include a spring anchoring loop. The second spring end portion may be anchored, for example, on a substrate through the spring anchoring loop. For example, when the clutch driving mechanism is part of a lock system, the substrate may include a shaft in the lock system.

In another embodiment, the second spring end portion may be mobile. For example, the second spring end portion may move simultaneously with the first spring end portion.

The first spring end portion or the second spring end portion may be an end portion of the torsion spring. For example, the first spring end portion or the second spring end portion may be from about 0.1% to about 50% of the total length of the torsion spring. For example, the first spring end portion or the second spring end portion may be about 1%, about 2%, about 5%, about 7%, about 10%, about 12%, about 15%, about 20%, about 30%, about 45%, and about 50% of the total length of the torsion spring.

The clutch rotating arm may include a first arm end portion, a middle arm portion, and a second arm end portion. The middle arm portion intermediate the first arm end portion and the second arm end portion. The clutch rotation arm may be operably coupled to the torsion spring at the first arm end portion. In one embodiment, the clutch rotating arm may generally adopt an L-like structure. The middle arm portion may be anchored serving as a pivoting point. In one embodiment, the middle arm portion may include an arm anchoring loop. In one embodiment, the arm anchoring loop may include a spiral ring structure. For example, the arm anchoring loop may be anchored on a substrate through the spiral ring structure. In one embodiment, when the clutch driving mechanism is part of a lock system, the substrate may include a shaft in the lock system. In one embodiment, the arm anchoring loop and the spring anchoring loop may be anchored on a same substrate, for example, on a same shaft.

The first arm end portion may be coupled with the first spring end portion so that the linear movement on the first spring end moves the first arm end portion causing the L-shaped clutch rotating arm to swing around the pivoting point and therefore producing a movement, such as swing motion, on the second arm end portion. The first arm end portion may be coupled to the first spring end portion in any fashion. In one embodiment, the first spring end portion may include, without limitation, a loop, a hook, or a bent and the first arm end portion is coupled to the first spring end through the loop, the hook, or the bent.

In one embodiment, the clutch driving mechanism may further include an actuating pin. The second arm end portion is configured to interact with the actuation pin so that movement of the second arm end portion is configured to move actuation pin. For example, at least a portion of the second arm end portion may abut against the actuation pin.

In one embodiment, the clutch driving mechanism may further include a first clutch shaft, a second clutch shaft, and an actuation pin. The first clutch shaft may be configured to receive at least a portion of the second clutch shaft; and the first clutch shaft and the second clutch shaft may be configured to rotate concentrically. The first clutch shaft and the second clutch shaft are configured to be operably coupled through the actuation pin. When the first clutch shaft and the second clutch shaft are in operably coupled state, they would rotate together. When the first clutch shaft and the second clutch shaft are in operably uncoupled state, each may rotate freely or independently from the other.

In one embodiment, the first clutch shaft may include a notch. The second clutch shaft may include a housing structure. When rotating the first clutch shaft, the second clutch shaft, or both, the notch and the housing structure are configured to align with each other. The actuation pin may be slidably received by the housing structure and the notch when the housing structure is aligned with the notch. When the actuation pin is substantially in the housing structure but not in the notch, the first clutch shaft and the second clutch shaft are operably decoupled therefore each may rotate independently. When the actuation pin resides in both the housing structure and the notch, for example, at least partially in the housing structure and at least partially in the notch, the first clutch shaft is operably coupled to the second clutch shaft therefore they rotate together.

In one embodiment, a pushing member may be configured to push the actuation pin at least partially into the notch. In one embodiment, the pushing member may be a spring housed within the housing structure. The spring may reside between the actuation pin and the inside wall of the housing structure and therefore is configured to abut against the actuation pin while pushing against the inside wall of the housing structure. In another embodiment, the pushing member may be gravity.

Therefore, in this embodiment, the motor may cause the rotation on the worm. The rotation of the worm may cause the linear movement on the torsion spring, which may move the first arm end portion of the clutch rotation arm. The clutch rotation arm may rotate around the pivoting point causing a swing motion on the second arm end portion. When the second arm end portion swings to a direction exerting a force on the actuation pin, the actuation pin slides substantially out of the notch and into the housing structure decoupling the first clutch shaft from the second clutch shaft. When the second arm end swings to an opposite directing removing the force on the actuation pin, the pushing member pushes the actuation pin at least partially into the notch coupling the first clutch shaft with the second clutch shaft.

Figure 1:
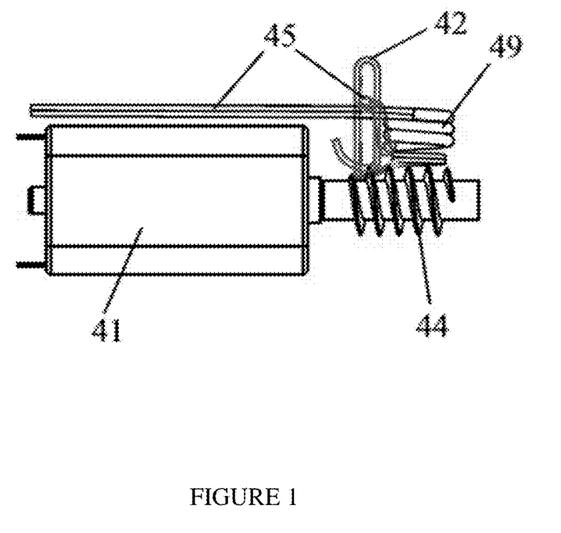
FIG. 1 shows a side view of a representative torsion spring (47) having a loop (42) at the first spring end.
Figure 2:
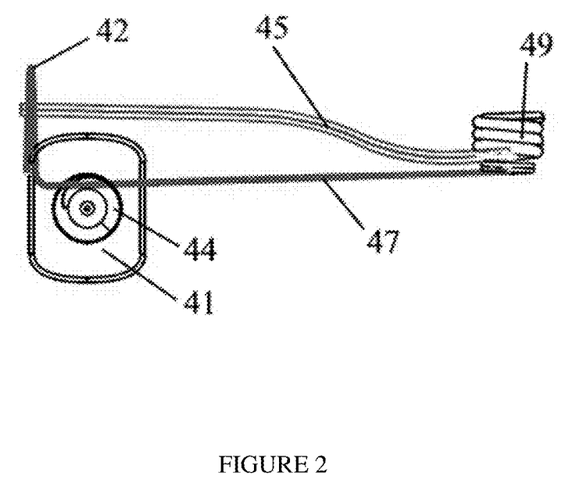
FIG. 2 shows a side view of a representative torsion spring (47) interacting with a representative clutch rotating arm (45) and worm (44)

In one embodiment, as shown in FIGS. 1 and 2, the clutch driving mechanism includes a motor (41) connected to a worm (44). The worm (44) may be directly coupled to the driving axis of the motor (41) or indirectly through various mechanical coupling means as long as the motor (41) drives the rotation of the worm (44).

A torsion spring (47) is coupled with the worm (44) at a first spring end portion so that the rotation of the worm (44) produces a linear swing motion on the first spring end portion. The second spring portion may be anchored onto any structural supports, housings, or substrates in the system or device. For example, the second spring end portion may be anchored onto a shaft (48) as show in FIG. 3. The second spring end portion may utilize loops, hooks, spiral springs, or any other comparable means to anchor onto the shaft (48).

Figure 3:
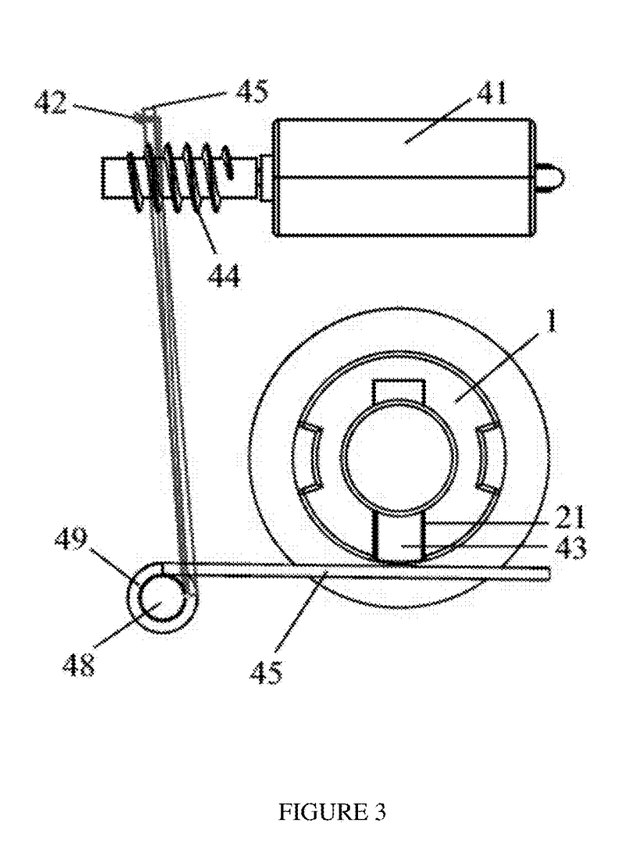
FIG. 3 shows a representative clutch driving mechanism with a second arm end of the clutch rotating arm (45) pushing against the actuation pin (43)

As shown in FIG. 3, the clutching driving mechanism may further include a clutch rotating arm (45) having a first arm end portion, a middle arm portion, and a second arm end portion. In one embodiment, the middle arm portion is anchored on the shaft (48). In one embodiment, the clutch rotating arm (45) may generally adopt an L-like structure. The middle arm portion may be anchored onto the shaft (48) through any mechanically viable means as long as the rotating arm may rotate substantially freely around the shaft (48). In one embodiment, the middle arm portion may include a spiral ring structure (49). The middle arm portion is anchored on the shaft (48) by looping the spiral ring structure (49) onto the shaft (48).

The first arm end may be coupled with the first spring end portion so that the linear swing motion on the first spring end portion produces a swing motion on the second arm end through the first arm end. Various mechanical means may be used to connect the first spring end portion to the first arm end portion. For example, the first spring end portion may include a loop (42) and the first arm end portion is coupled with the first spring end portion through the loop (42).

Figure 4:
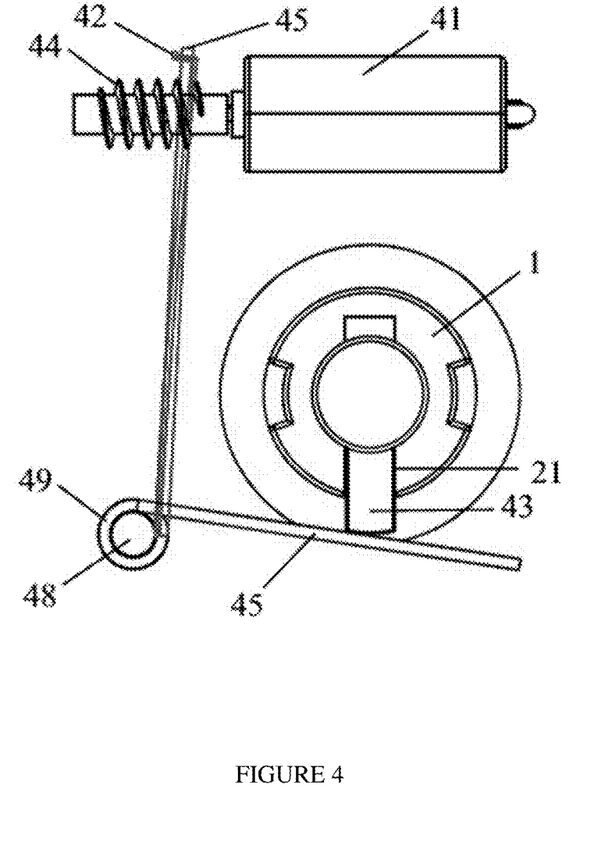
FIG. 4 shows a representative clutch driving mechanism with a second arm end of the clutch rotating arm (45) leaving the actuation pin (43), which allows the actuation pin (43) to slide at least partially out of the housing structure (21)
Figure 5:
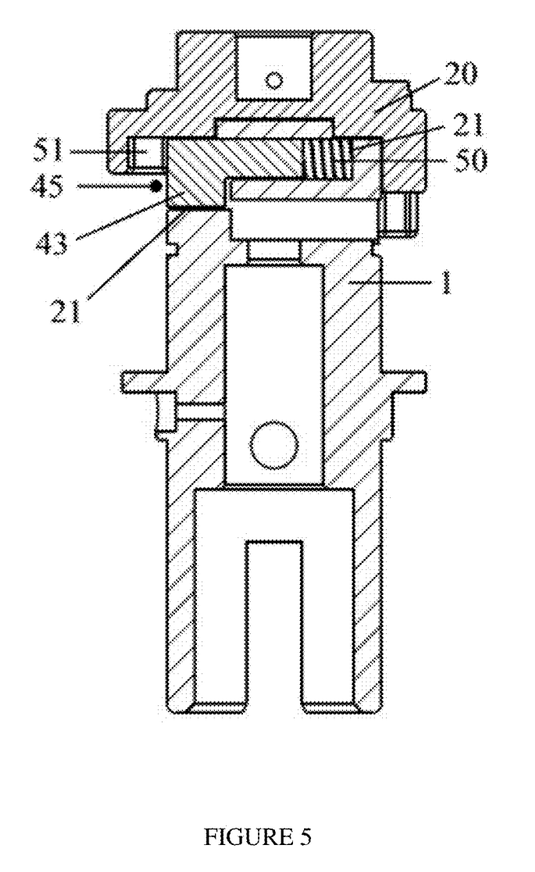
FIG. 5 shows a representative clutch mechanism, in which the actuation pin (43) resides substantially inside the housing structure (21), decoupling the first shaft (20) from the second shaft (1)
Figure 7:
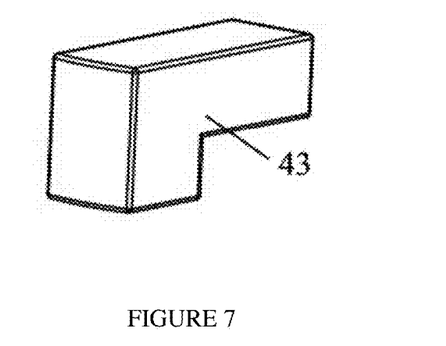
FIG. 7 shows a perspective view of a representative actuation pin (43)
Figure 8:
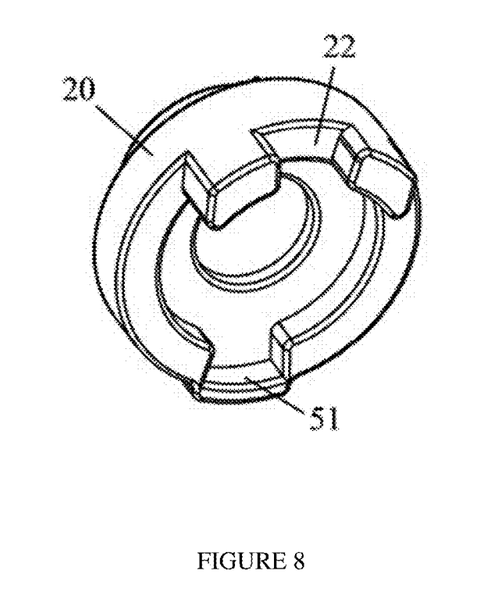
FIG. 8 shows a back perspective view of a representative configuration for a first clutch shaft (20)
Figure 9:
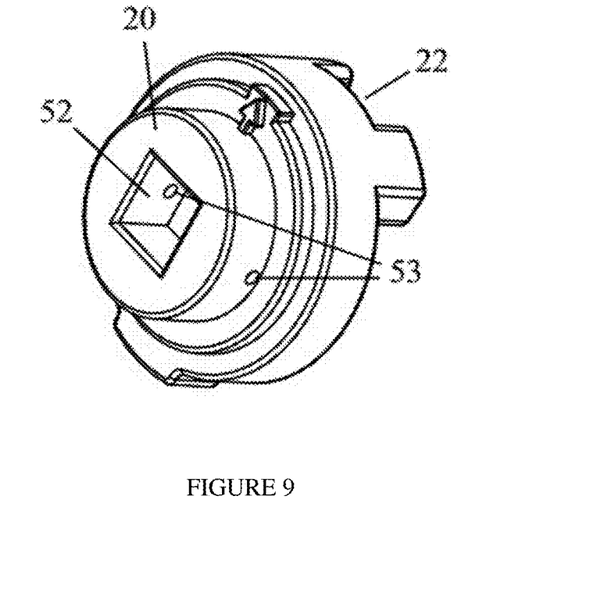
FIG. 9 shows a front perspective of the representative clutch shaft (20).

As shown in FIGS. 3, 4 and 5, the clutch mechanism may further include a first clutch shaft (20), as shown in FIGS. 8 and 9, a second clutch shaft (1), and an actuation pin (43), as shown in FIG. 7. The first clutch shaft (20) is configured to receive at least a portion of the second clutch shaft (1) so that the first clutch shaft (20) and the second clutch shaft (1) are configured to rotate concentrically.

Figure 6:
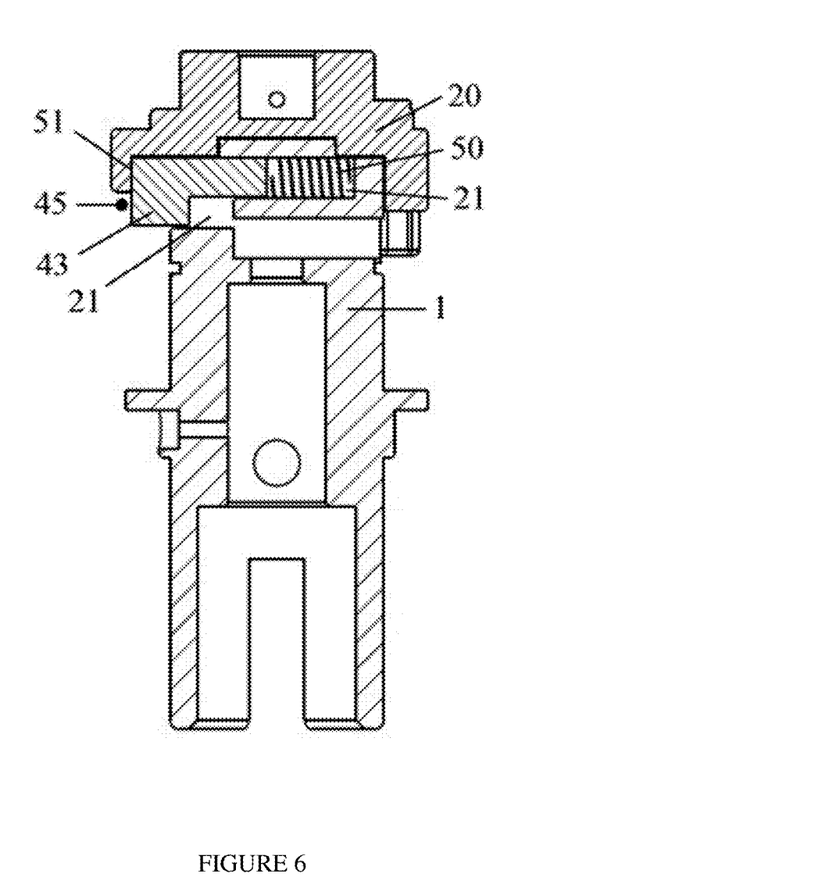
FIG. 6 shows a representative clutch mechanism, in which the actuation pin (43) slides partially out of the housing structure (21) and into the notch (51) coupling the first shaft (20) and the second shaft (1)

As shown in FIGS. 6 and 8, the first clutch shaft (20) may include a notch (51). The notch (51) may be any shape or sizes. The second clutch shaft (1) may include a housing structure (21). The notch (51) and the housing structure (21) may be configured to align when rotating the first clutch shaft (20), the second clutch shaft (1), or both.

An actuation pin (43), as shown in FIG. 7, may be housed inside the second clutch shaft (1). In one embodiment, the actuation pin (43) may be housed inside the housing structure (21) and may be configured to slide partially out of the housing structure (21) and into the notch (51) when the housing structure (21) is aligned with the notch (51). For example, a pushing member, such as a spring (50), may be housed in the housing structure (21). The spring (50) may be configured to exert a force on the actuation pin (43) pushing the actuation pin (43) at least partially into the notch (51).

Referring back to FIGS. 3 and 4, the second arm end of the clutch rotating arm (45) may interact with an actuation pin (43). In operation, referring to FIG. 3, when the motor (41) rotates the worm (44) in one direction causing the first spring end portion to move to the left along the length of the worm (44). The motion causes the first arm end portion to swing to the left, which in turn causes the second arm end to swing up exerting a force on the actuation pin (43) and pushing the actuation pin (43) out of the notch (51) and into the housing structure (21). As shown in FIG. 5, when the actuation pin (43) is substantially in the housing structure (21) but not in the notch (51), the first clutch shaft (20) decouples from the second clutch shaft (1). The first clutch shaft (20) and the second clutch shaft (1) are configured to rotate independently. In a lock system, this would lead to the locking of the lock.

Referring again to FIG. 3, when the motor (41) reverse-rotates the worm (44) in the opposite direction, the first spring end portion move to the right along at least a portion of the length of the worm (44). The motion causes the first arm end portion to swing to the right, which in turn causes the second arm end to swing down leaving, therefore removing the force from, the actuation pin (43). The pushing member, spring (50), pushes the actuation pin (43) at least partially into the notch (51). Alternatively, gravity may act as the push member pulling the actuation pint (43) at least partially into the notch (51). As shown in FIG. 6, when the actuation pin (43) partially slides out of the housing structure (21) and into the notch (51), the first clutch shaft (20) becomes coupled to the second clutch shaft (1). The first clutch shaft (20) and the second clutch shaft (1) are configured to rotate together. In a lock system, this would lead to the unlocking of the lock.

As a result, the rotation of the motor controls the second arm portion of the rotation arm (45) to push or leave the actuation pin (43), achieving the function of the clutch driving mechanism.

In another aspect, the disclosure provides locks systems, devices, apparatus, and systems having the above described clutch driving mechanism.

In a further aspect, the disclosure provides doors, furniture, buildings, apparatus, devices, and systems having the above described locks.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, may be arranged, substituted, combined, separated, and designed in a wide variety of different configurations, all of which are explicitly contemplated herein.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components. In addition, the "operably coupled," "operably connected," "coupled," or "connected" may be either directly coupled or connected or indirectly coupled or connected.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, may be arranged, substituted, combined, separated, and designed in a wide variety of different configurations, all of which are explicitly contemplated herein.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior disclosure.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A clutch driving mechanism, comprising a motor, a worm, a torsion spring and a clutch rotating arm, wherein the motor is rotationally coupled with the worm, wherein the worm is operably coupled to at least a portion of the torsion spring, and the torsion spring is operably coupled to at least a portion of the clutch rotation arm; wherein the torsion spring comprises a first spring end portion and a second spring end portion, and wherein the first spring end portion is operably coupled with the worm; and wherein the second spring end portion is anchored, and wherein the rotation of the worm is configured to produce a linear swing motion on the first spring end portion while the second spring end portion is configured to stay stationary.

2. The clutch driving mechanism of claim 1, wherein the second spring end portion comprises a spring anchoring loop, and wherein the second spring end portion is anchored through the spring anchoring loop.

3. A clutch driving mechanism, comprising a motor, a worm, a torsion spring and a clutch rotating arm, wherein the motor is rotationally coupled with the worm, wherein the worm is operably coupled to at least a portion of the torsion spring, and the torsion spring is operably coupled to at least a portion of the clutch rotation arm; wherein the clutch rotating arm comprises a first arm end portion, a middle arm portion, and a second arm end portion, wherein the middle arm portion intermediates the first arm end portion and the second arm end portion, and wherein the clutch rotation arm is operably coupled to the torsion spring at the first arm end portion; and wherein the clutch rotating arm comprises a L-like structure, and wherein the middle arm portion is anchored serving as a pivoting point.

4. The clutch driving mechanism of claim 3, wherein the middle arm portion comprises an arm anchoring loop, and wherein the arm anchoring loop is anchored on a structure.

5. The clutch driving mechanism of claim 4, wherein the arm anchoring loop comprises a spiral ring structure.

6. A clutch driving mechanism, comprising a motor, a worm, a torsion spring, a clutch rotating arm, and an actuating pin, wherein the motor is rotationally coupled with the worm, wherein the worm is operably coupled to at least a portion of the torsion spring, and the torsion spring is operably coupled to at least a portion of the clutch rotation arm; wherein the clutch rotating arm comprises a first arm end portion, a middle arm portion, and a second arm end portion, wherein the middle arm portion intermediates the first arm end portion and the second arm end portion, and wherein the clutch rotation arm is operably coupled to the torsion spring at the first arm end portion; and wherein the second arm end portion is configured to interact with the actuation pin so that movement of the second arm end portion is configured to move actuation pin.

7. The clutch driving mechanism of claim 6, wherein at least a portion of the second arm end portion is configured to abut against the actuation pin.

8. The clutch driving mechanism of claim 7, further comprising a first clutch shaft and a second clutch shaft, wherein the first clutch shaft is configured to receive at least a portion of the second clutch shaft, wherein the first clutch shaft and the second clutch shaft are configured to rotate concentrically, and wherein the first clutch shaft and the second clutch shaft are configured to be operably coupled through the actuation pin.

9. The clutch driving mechanism of claim 8, wherein the first clutch shaft and the second clutch shaft are configured to rotate together when coupled by the actuation pin.

10. The clutch driving mechanism of claim 8, wherein the first clutch shaft and the second clutch shaft are configured to rotate freely or independently when operably uncoupled.

11. The clutch driving mechanism of claim 8, wherein the first clutch shaft comprises a notch, wherein the second clutch shaft comprises a housing structure, wherein, when rotating the first clutch shaft, the second clutch shaft, or both, the notch and the housing structure are configured to align with each other, and wherein the actuation pin is configured to be received by the housing structure and the notch when the housing structure is aligned with the notch.

12. The clutch driving mechanism of claim 11, wherein, when the actuation pin is substantially in the housing structure but not in the notch, the first clutch shaft and the second clutch shaft are operably uncoupled, and wherein, when the actuation pin is at least partially in the housing structure and at least partially in the notch, the first clutch shaft is operably coupled to the second clutch shaft.

13. The clutch driving mechanism of claim 11, further comprising a pushing member, wherein the pushing member is configured to push the actuation pin at least partially into the notch.

14. A lock system, comprising a motor, a worm, a torsion spring, a clutch rotating arm, and an actuating pin, wherein the motor is rotationally coupled with the worm, wherein the worm is operably coupled to at least a portion of the torsion spring, and the torsion spring is operably coupled to at least a portion of the clutch rotation arm; wherein the torsion spring comprises a first spring end portion and a second spring end portion, wherein the first spring end portion is operably coupled with the worm, wherein the clutch rotating arm is substantially L-shaped comprising a first arm end portion, a middle arm portion, and a second arm end portion, wherein the middle arm portion intermediates the first arm end portion and the second arm end portion, wherein the first arm end portion is operably coupled to the first spring end portion, wherein the middle arm portion is anchored serving as a pivoting point, and wherein the second arm end portion is configured to interact with the actuation pin.

15. The lock system of claim 14, further comprising a first clutch shaft and a second clutch shaft, wherein the first clutch shaft is configured to receive at least a portion of the second clutch shaft, wherein the first clutch shaft and the second clutch shaft are configured to rotate concentrically, wherein the first clutch shaft and the second clutch shaft are configured to be operably coupled through the actuation pin, wherein the first clutch shaft and the second clutch shaft are configured to rotate together when coupled and to rotate freely or independently when operably uncoupled.

* * * * *